March 18, 1941.  L. E. SHAW  2,235,122

VARIABLE SPEED TRANSMISSION

Filed Sept. 22, 1937  2 Sheets-Sheet 1

INVENTOR
LOUIS E. SHAW
BY
Orton and Griswold.
ATTORNEYS

March 18, 1941.  L. E. SHAW  2,235,122
VARIABLE SPEED TRANSMISSION
Filed Sept. 22, 1937   2 Sheets-Sheet 2
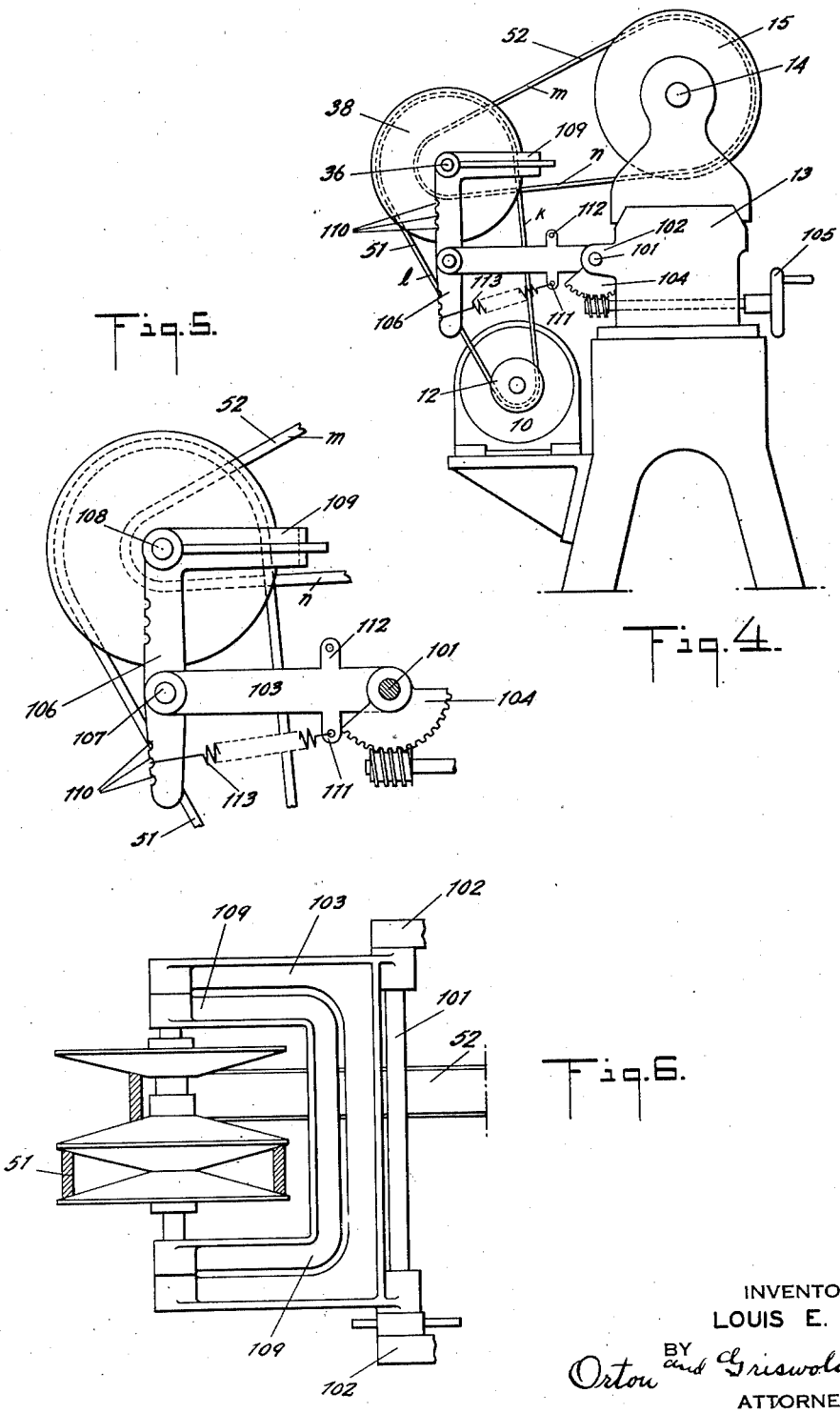
INVENTOR
LOUIS E. SHAW
BY Orton and Griswold
ATTORNEYS Patented Mar. 18, 1941

2,235,122

UNITED STATES PATENT OFFICE 2,235,122

VARIABLE SPEED TRANSMISSION

Louis E. Shaw, East Orange, N. J.

Application September 22, 1937, Serial No. 165,059

13 Claims. (Cl. 74—230.17)

The invention relates to a variable speed transmission of the V-belt type in which a driving member is in driving belted relation with a driven machine member through the agency of a speed adjuster including a pair of expandable pulleys having V-belts engaging them and wherein by varying the radius of the arc which the belts travel around their associated expandable pulleys, the speed ratio between the driving and driven members may be varied at will.

The primary object of the invention is to provide a compact and simple form of variable speed drive of the type outlined and by means of which the change in speed ratio may be obtained much more quickly than has been possible with similar devices heretofore known and by means of which a more accurate control is provided and an easier slipping of the relatively movable parts into their several adjusted positions is attained.

The invention features certain refinements in construction to avoid vibration, to compensate for wear on the parts and to minimize possibility of the belts reversing themselves and in general to insure a smooth acting, steady and efficient type of variable speed transmission of the type outlined.

The invention has for other objects the providing of a mounting which will feature anti-friction characteristics; to provide a construction in which the driving belts are maintained automatically in their preset planes in the several positions in which the variable speed controlling elements are adjusted; to maintain a uniformity of engagement between the edges of the belts and the pulley faces with which they engage in all the relatively shifted positions of the belts on the pulleys.

Various other objects and advantages of the invention will be in part obvious from an inspection of the accompanying drawings and in part will be more fully set forth in the following particular description of one form of mechanism embodying the invention, and the invention also consists in certain new and novel features of construction and combination of parts hereinafter set forth and claimed.

In the accompanying drawings:

Fig. 4 is a view in side elevation of a modified form of the invention featuring a structure for maintaining uniformity in tension on the two belts particularly for use where the belts extend at an angle to each other;

Fig. 5 is an enlarged view of the portion of the showing in Fig. 4 showing a floating form of the mounting for the transmission; and Fig. 6 is a plan view looking down upon part of the showing in Fig. 5.

Figure 1:
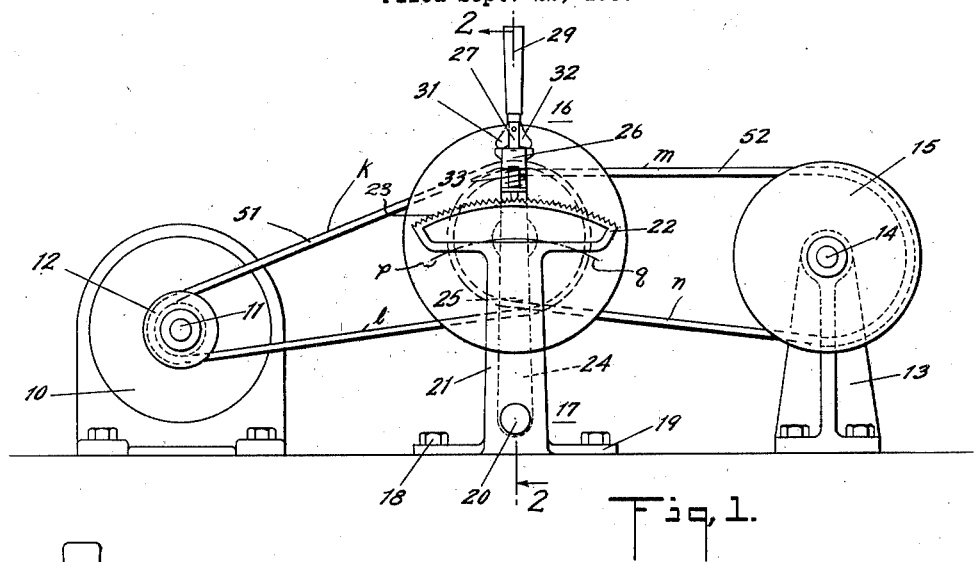
Fig. 1 is a view in side elevation of a preferred embodiment of the invention.

In the drawings and referring first to the showing in Fig. 1, there is shown a source of power represented by an electric motor 10 on the shaft 11 of which is fixed a small pulley constituting a driving member 12. To the right of this showing there is disclosed a support frame 13 symbolically representing the machine driven from the motor and which machine includes a driven shaft 14 carrying a large pulley 15 constituting the driven member of the power drive herein featured. Positioned between the motor and machine is a change speed device designated generally by the reference character 16.

This device includes a wide base frame 17 secured to its support by bolts 18. The frame includes a wide lower portion 19 in which is carried a bracket supporting shaft 20. The frame also includes an upstanding T-shaped front standard 21, the upper end of which is enlarged in width to form a segmental arc 22 and the upper edge of which is machined to provide a series of locating notches 23. A rocking bracket 24 is mounted in the shaft 20 and is provided with an upstanding arm 25 terminating at its upper end in a head 26 which overlaps the segment arc 22. A plunger 27 is guided for movement through the head 26 and is provided at its lower end with a knife edge 28 for engaging selectively in one of the notches 23 so as to hold the arm in whatever position it may be adjusted. A lever handle 29 is pivoted by means of a fulcrum pin 30 to the upper end of the plunger for rocking movement in the plane of movement of the head 26. The lever is provided on opposite sides of the pin 30 with a pair of outstanding fulcrum ears 31 and 32 and normally located slightly above the top of head 26. A spring 33 reacts between the underside of the heads and a stop plate 34 formed on the lower portion of the plunger to urge the plunger towards the segment arc and to maintain the ears normally slightly above the top of the bracket arm.

It is understood that swinging the lever handle in one direction from the upright position shown in Fig. 1, say to the right will cause the right hand ear 32 to bear on the head 26 and thus constitute an off-set fulcrum for effecting a powerful lever action to lift the knife edge 28 against the action of the spring 333 and clear of the notches of the segment thus unlocking the bracket from the frame. Continued movement of the handle to the right will shift the arm 25 about the shaft 20 into any desired position necessary to obtain the desired ratio between the speed of the driving and driven members as hereinafter disclosed. Releasing pressure on the handle will permit the spring to lower the plunger into its locking engagement with the notch opposite the edge 28 and incidentally restore the handle to its normal position in prolongation of the length of the arm. It is understood that a movement of the lever to the left from any position of the arm will similarly unlock the bracket and then shift the arm and a releasing of any such pressure on the handle lever will automatically lock the bracket in the newly set position.

The arm 25 is provided adjacent its upper end with a rugged boss 35 from which projects a long, non-rotating shaft or stud 36 which extends parallel to the shaft 20. The stud provides the support for the several forms of change speed devices shown in the several figures, except the showings in Figs. 7–9, where the corresponding stud is supported at both ends. The advantage of the construction with its exposed ends shown in Fig. 1 is that the several belts may be quickly installed in position simply by slipping them over the pulleys hereinafter described.

Loosely mounted on the stud is a long sleeve 37 which is free for both axial and rotary movement. Secured to opposite ends of the sleeve is a pair of cone faced end flanges or disc members 38 and 39 fastened to the sleeve by pins 40 so that the end discs are fixed relative to each other but are free to move with the sleeve axially as well as rotatively about the axis of rotation indicated by the line a—b. Slidably mounted on the sleeve between the end discs 38 and 39 is a double-cone face intermediate member 41 which is also free to rotate about the axis a—b, and has a limited freedom of axial movement being limited in such movement by engagement with one or the other of the end discs. The member 41 is provided with a relatively long hub 42 designed to provide a long bearing on the sleeve. In order to permit the belt engaging portion of the end discs and this intermediate member to approach each other rather closely, the end discs are each provided with an annular recess 43 designed to receive the adjacent axially projecting end 44 of the hub 42. It is noted that the projecting portion 44 of the hub has a length greater than one half of the width of the belt. This is for the purpose of receiving the belt as it assumes a smaller diameter than that shown to the right of Fig. 2 and in this way prevents the belt from having an edge thereof curl inwardly on to sleeve 37. The opposing faces 45 and 46 of the end discs are of conical form considered outwardly of their associated recess 43 and the intermediate flange member 41 is of a double cone construction with its faces 47 and 48 converging outwardly of the hub 42 towards its peripheral edge 49¹. In this way one of the end discs, such, for instance, as the disc 38 coacts with the adjacent end of the intermediate member to form a driving power transmitting pulley 50 of the expandable type and the other end disc coacts with the adjacent side of the intermediate member to form a driven power transmitting pulley 50 of the expandable type.

The pulley 49 is connected to the driving member 12 by a V-belt 51 and the pulley 50 is similarly connected to the driven member 15 by a V-belt 52.

Figures 2, 3:
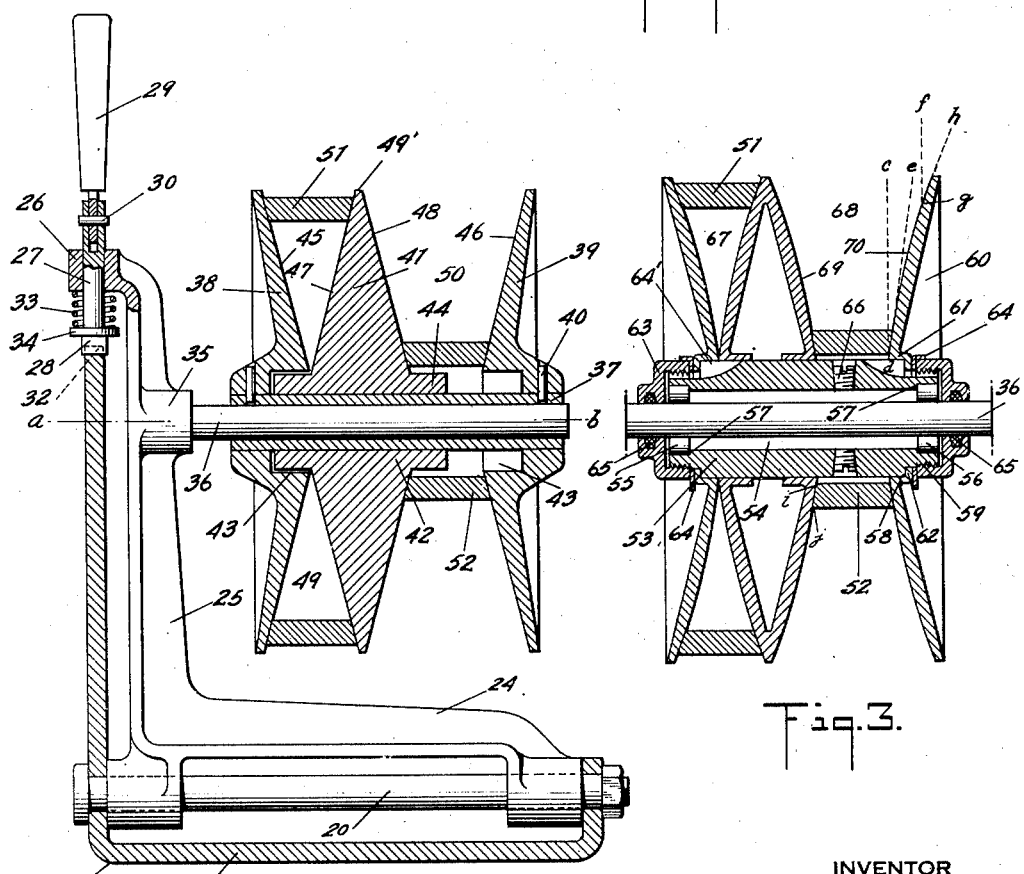
Fig. 2 is a vertical sectional view taken on the line 2—2 of Fig. 1 through the control parts and taken axially through the change speed mechanism with the belts in extreme positions.
Fig. 3 is a view of a modified form of the change speed mechanism of Figs. 1 and 2 featuring a curved face to the transmission pulleys and an anti-friction mounting of these pulleys.

It will be understood that the device as shown in Figs. 1 and 2 operates as is well known for devices of this character. Assuming that with the arm 25 in the normal upright position and with the belts say disposed relative to one another to effect substantially a one-to-one drive, the lever may be shifted say towards the right which will have the effect of loosening the right hand belt 52 on pulley 50 and tightening belt 51 on its pulley 49 with the resulting tendency that the belt 51 will tend to reduce its radius of curvature about pulley 49 and thus move inwardly towards the axis from the position shown in Fig. 1, incidentally pushing the floating intermediate member axially away from the observer as viewed in Fig. 1 or to the right as viewed in Fig. 2 until the slack in the belt 52 is taken up and the belt having moved outwardly from its position shown in Fig. 1 assumes a new position with a balancing of tension between the belts when the belts are at rest or differently expressed with a balancing of pressures between the sides of the pulleys and the edges of the belts.

The disclosure in Fig. 3 features a form of mounting of the floating pulleys on the stud by the employment of antifriction devices in this form shown to be roller bearings in a lubricant containing chamber. The disclosure also features a form of belt edge engaging conical face of the pulleys which will tend to minimize distortion of the belt and maintain as far as practicable a uniformity of engagement between the belt and pulley faces irrespective of the radial location of the belts as they are looped about the pulleys. Referring first to the antifriction feature, it will be noted that the stud is encircled by a hollow sleeve 53 corresponding to the sleeve 37 except that its bore has a greater diameter so as to provide an annular lubricant containing chamber 54. Roller bearings 55 and 56 are located at opposite ends of the sleeve for supporting the same in free rotary movement on the stud 36. Opposite ends of the sleeve and associated parts are of the same construction so that a detailed description of one will suffice for the other. The end of the bore forming the chamber 54 is counterbored to provide an internal shoulder 57 against which is fitted the associate roller bearing 55 or 56. On its outer side the sleeve is reduced to form an external shoulder 58 and the reduced portion is provided with threads 59. An end disc 60 corresponding to end disc 38 or 39 is provided with a hub 61 with fits over the unreduced portion of the sleeve adjacent the shoulder and from the hub an annular ring 62 extending integrally and inwardly from the inner end of the hub fits against the external shoulder 58. An end cap 63 encircles the stud and is in engagement with the threads 59 to seal the adjacent end of the lubricant chamber. A thin washer 64 is positioned between the end cap and the ring 62 and includes a tongue extending into a milled slot 64¹ and the parts are so proportioned that tightening up the end cap forces the washer against the right and therethrough acts to secure the adjacent end disc in clamped position on the sleeve. A gland packing 65 between the end cap and stud tends to prevent leakage of the lubricant outwardly along the stud. Plugged holes 66 provide a means for introducing lubricant into the chamber 54.

It is noted that the frusto-conical faces of the pulley sides as shown in Fig. 3 are not flat surfaces as has been known heretofore in this art and as shown in the form illustrated in Fig. 2. The belt engages faces 67 in this embodiment of the invention and these faces are curved from their inner portions outwardly towards their outer perimeters.

Differently defined, the belt receiving expandable pulley grooves 67 and 68 each have their opposing outlining faces such as those shown at 69—70 curved convexedly towards each other and the included angle between the faces progressively increase outwardly from the axis of rotation of the pulley. In other words, the angle $c-d-e$ which the inner portion of curved face 70 in Fig. 3 makes with the vertical rapidly increases towards its perimeter so that the angle $f-g-h$ at the outer edge of face 70 is greater than $c-d-e$. It is understood in devices of this character that as a V-belt of the type disclosed is curved about progressively smaller radius as it approaches the axis of its associated pulley, such bendings tend to and at least to a limited degree actually do distort the cross sectional configuration of the belt even when made of material and reinforced to resist such distortions. They become progressively under greater compression on their inner faces or sides than at the outer parallel sides with a tendency of the inwardly bevelled side edges to approach the vertical. The curved faces of the pulley are designed to correspond as closely as possible to this unavoidable distortion of the belt as it is shifted towards a relatively smaller radius of turn. It is understood that this curvature varies with the thickness of the belt, with the material of which the belt is formed and is controlled at least in part by the speed at which the belt is driven so that no one curvature can be given which will be suitable for all conditions.

The particular curve illustrated was obtained by bending the belt first about a small radius such as the radius occupied by the right hand belt 52 in Fig. 3, ascertaining the inclination from the vertical $c-d$ and the extent of the edges $i-j$ when in this position, and then plotting the portion of the disc at this position of the belting to correspond to that configuration of the belt as accurately as is physically possible. The belt was then progressively shifted into gradually increasing radius of curvature at the different loops about the pulley until the belt was in its outermost position shown by the belt 51 on the left hand side of Fig. 3. At each step in the enlargement of the radius the lengths of the edges, that is, the thickness of belts $i-j$ was carefully measured and within this measured line the inclination of the edges at each such location relative to the plane of rotation of the belt was plotted and the portion of the disc face engaged by the belt at each of said measured locations was plotted and eventually the curve at 70—69 was obtained. In this way the pulley faces were designed to fit the belt rather than the belt endeavoring to fit itself to the flat faces of the discs in the known prior structures.

In the arrangement of parts shown for instance in Fig. 1, the belts 51 and 52 extend from the change speed construction at the center of the figure more or less in opposite direction and the axis of rotation $a-b$ as it swings over its arc $p-q$ exerts substantially equal tension on both reaches such as $k-l$ of belt 51 and similarly exerts equal tension on the reaches $m-n$ of belt 52 so that as the change speed device is shifted to the right or left of the showing in Fig. 1, the tension on each reach is balanced in accordance with good belt transmission practice. In Fig. 1 the axis of shaft 20 is located so that as the change speed construction is shifted to the right or left of the showing in Fig. 1, every point on its arc $p-q$ (at least at and adjacent its mid-length) is the point of intersection of arcs having the axes of the shafts 11 and 14 as centers and having radii such that there is equal initial tension on both radii of the belt and thus no slack in the belts when at rest in the several adjusted positions of the change speed construction.

With given belt lengths, therefore, it is possible to calculate the distances between the change speed pulley axis $a-b$ and the axes of the driving and driven pulleys for all radii of the belts where they pass over the change speed pulleys, and thus by striking intersecting arcs from the centers of the driving and driven shafts to determine the exact path $p-q$ which the change speed pulley must follow in order to maintain a uniform initial tension in the belts.

The disclosure in Fig. 1 with its fixed axis of swing for the change speed pulley is entirely satisfactory where the lengths of the belts are more or less fixed and where the axis of the shaft 20 can be fixedly located at the center of the correct arc.

In the arrangement of the parts shown, for instance in Fig. 1, the belts 51 and 52 extend from the change speed construction at the center of the figure and in opposite direction and at almost a straight line. In this case, the sides of the pulleys engage the edges of the belts at substantially the same pressure.

When the device is shifted to the right or left to move the axis of rotation $a-b$ over its arc $p-q$ there is a momentary change in this pressure until the axis $a-b$ comes to rest in its new position whereupon the pressure between the pulleys and the two belts again become equalized. A different condition develops, however, where the belts extend at a sharp angle to each other as disclosed in Fig. 4. If the pulley axis were shifted about an arc concentric with the axis of the driving member, for instance, the belt tension of the driving belt would, of course, be maintained constant but such a movement of the axis would of course be very apt to loosen the tension on the driven belt.

In the form of the disclosure shown in Figs. 4 to 6, a modified form of mounting for the stud 36 is suggested with the objective of providing a structure in which belt tension is maintained in balance in each belt in all positions in which the change speed construction may be shifted as hereinbefore described. Broadly this is attained by always locating the axis of rotation of the pulleys at the intersection of two arcs, one having its center at the axis of the driving member and the other having its center at the axis of the driven member so that the radii of the respective arcs will be at all times respectively equal to the center to center distances between the pulleys engaged by the belts 51 and 52 without slack in the belts.

Referring first to Fig. 4, there is disclosed an end view of a machine such as a lathe and which may be the driven machine of Fig. 1. The driven shaft 14 of the machine is driven at variable speed from the motor 10 supported on a bracket 131 projecting from the support 13 through change speed devices mounted on stud 36 as hereinbefore described. In this case, instead of mounting the stud 36 fixed to a locked rock arm or bracket 24 as was the case in the preferred embodiment of the invention in Fig. 2, the stud 36 is mounted on a floating tension arm, spring controlled to maintain the belts under tension in the several positions in which the stud may be shifted. For this purpose there is provided a shaft 101, corresponding to the shaft 20, carried in a pair of lugs 102 formed on the support 13. Rockably mounted upon the shaft 101 is a U-arm or bracket 103 corresponding to the bracket 24. This arm 103 is rotated about the axis of shaft 101 by a worm and segmental gear drive 104 actuated from hand wheel 105 to raise and lower the arm 103 from the horizontally extending position shown in Figs. 4. Carried by each of the opposite parallel arms of the bracket 103 is an upstanding tension lever 106 fulcrumed intermediate its length on a pin 107. Fixed to the upper ends of the pair of tension levers 106 is a stud 108 corresponding to stud 36. It is herein suggested that the two tension levers 106 be connected by D-yoke 109 to give rigidity to the structure. However, this yoke is not necessary to the operation of the device. The two arms of one or both of the levers 106 are provided with spring anchoring notches 110 and the arm 103 is provided on opposite sides thereof with spring anchoring lugs 111 and 112. Positioned selectively between either of the lugs 111 or 112 and the notches on the corresponding side is a tension spring 113. Referring particularly to the showing in Fig. 5, it will be noted that the spring is in this case located below the arm 103 and acts in a tendency to swing the change speed construction as a whole and particularly to swing the axis a—b to the left of the showing in Fig. 5 and about 107 as a center in this way to cause the pulley engaging belt 52 to take up tension on the belt under conditions where the arm 103 has been turned clockwise about 101 as an axis with incidental loosening of belt 52 with its associated expandable pulley. Should the arm 103 extend from lever 106 in the opposite direction from that shown in Fig. 5 and the adjustment involve a lowering or clockwise movement of the arm 103 thus tending to loosen the belt 51, the spring 113 would have been positioned above the arm 103 to similarly take up the looseness in the belt 51. In general, it will be understood that the construction is such that with the shifting of the change speed device into its several positions to obtain the requisite ratio between the driven and driving members, spring 113 tends to locate the pulleys automatically in position so that when set the axis of rotation of the pulleys will be at the intersection of two arcs, one arc having the axis of shaft 14 as a center and the other arc having the axis of member 12 as a center.

Referring to Fig. 5 it will be seen that as the U-arm 103 is shifted say clockwise or upwardly, tension is increased on belt 51 and released on belt 52 as previously described for the Fig. 2 form of the invention. During any such manual shifting of the pulley as a whole to attain the desired difference in speed, the spring 113 acts automatically to shift the pulleys outwardly of the angle between the two belts until the slack in both belts is taken up and the interdriving engagement is restored.

In operation it is understood that by a proper shifting of the speed control device either by the mechanism shown in Fig. 1, or Fig. 7, the relation of the radius of engagement of the belts with their associated pulleys may be varied as is common with known devices of this character. One important feature of novelty in the present disclosure over such known constructions is that the change speed pulleys as a whole are free to shift axially as well as free to accommodate their pulley grooves to the adjusted position of the belts relative to the change speed device, and at the same time to maintain the belts each in its originally set plane containing respectively the driving and driven members.

The disclosure in general, and particularly the disclosure which features the curved design of the pulley face which contacts the edge of the belt features a driving engagement between the belt and pulley which remains substantially constant at the different radial positions of the belt thus insuring uniformity of power transmission at the several different speeds. The pulleys do not distort the belts any more than they are themselves distorted by virtue of their curving at opposite ends of the belt about radii which vary in the different positions of the belts in their engagement with their associated expandable pulleys. Differently expressed, the free floating characteristics of the pulleys especially where their belt engaging faces are contoured to respond to variations in the edges of the belt, tends to eliminate the introduction of friction and other factors which have heretofore tended to vary the desired accuracy in the setting of ratio between the driving and driven members in devices of this character.

While there have been shown, described and pointed out in the annexed claims, certain novel features of the invention, it will be understood that various omissions, substitutions and changes in the form and details of the mechanism illustrated and in its operation may be made by those skilled in the art without departing from the spirit of the invention.

I claim:

1. In a device of the class described, the combination of a power driving member and a machine driven member, a change speed device of the V-belt type disposed therebetween and including a pair of coacting expansible pulleys mounted for rotary movement about an axis of rotation, a pair of V-belts connecting the pulleys with the members, an arm mounted for pivoted movement about a fixed axis, means for moving the arm into a plurality of adjusted positions, a tension lever fulcrumed to said arm and providing a support for said axis of rotation of the pulleys and resilient means between the tension lever and said arm acting to move the change speed device in a direction substantially bisecting the angle formed between the belts thereby tending to equalize the initial tension on both belts in all adjusted positions of the arm.

2. A change speed device of the V-belt type comprising a support, an arm pivotally mounted on the support, a tension lever fulcrumed intermediate its length to said arm, a set of V-belt change speed pulleys carried at one end of the lever, belts engaging said pulleys, a spring reacting between the arm and the lever tending to swing the pulleys into tension equalizing engagement with the belts, and means for manually adjusting the position of the arm.

3. In a change drive of the V-belt type, the combination with a driving pulley and a driven pulley each having a fixed axis of rotation, of a pair of intermediate pulleys mounted for rotary movement about a common floating axis offset from both of said fixed axes, said intermediate pulleys being free to move axially in either direction along said floating axis, a pair of V-belts looped about the pulleys and extending from the floating axis at an angle to each other, a mounting for the intermediate pulleys, manually actuated control means acting on the mounting for shifting the intermediate pulleys in space to and from the driving and driven pulleys, and resilient means acting through the mounting and at all times tending to move the intermediate pulleys in a direction to move their floating axis outwardly of the angle formed between the belts.

4. In a device of the class described, the combination of a driving power pulley, a driven machine pulley, a change speed device including an intermediate double expansible pulley comprising a driving pulley and an intermediate driven pulley both mounted for rotary movement about an axis, a V-belt connecting the power driving pulley with the intermediate driven pulley, a V-belt connecting the driving intermediate pulley with the driven machine pulley, control means engaging the device for shifting said axis at will for changing the relative radial engagement of the belts about the intermediate pulleys in reverse order to vary the relative speed between the first named driving and driven pulleys, and means automatically responsive to the presence of slack in one of the belts to shift said axis from the position in which it was set by said control means to take up any such slack and thus to maintain substantially equal pressure between the sides of the intermediate pulleys and the belts in all adjusted positions of the change speed device.

5. In a change speed device, the combination of a double expansible pulley mounted for rotary movement about an axis, a pair of V-belts each engaging respectively an element of said pulley, a driving power pulley engaging one of the pair of V-belts and a machine driven pulley engaging the other of said pair of belts, manually actuated control means engaging said pulley for shifting its axis at will to vary the radial positions of the belts on the pulley in reverse order and means acting automatically on the pulleys after it has been so shifted to shift the axis slightly in a direction to take up slack in the belt having the greater slack thereby to equalize the frictional engagement of each belt and its associated element of the pulley.

6. In a device of the class described, the combination of a driving member, a driven member, and an adjustable change speed mechanism, the driving and driven members revolving about fixed centers, belts connecting the change speed mechanism with the driving and driven members, a mounting for the mechanism including resilient means tending to move the change speed mechanism away from the driving and driven members, and into bearing engagement with the adjacent ends of both belts to take up slack therein, and means for moving the change speed mechanism bodily along a path roughly parallel to a line drawn between the centers of the driving and driven members, the position assumed by the change speed drive when in any operative position in said path being defined by the combined restraining action of the belts in opposing the action of said resilient means.

7. In a drive of the class described, the combination of a driving member, a driven member and a driving connection therebetween including a change speed mechanism, said mechanism including a pair of pulleys mounted for rotation about an axis parallel to the axes of both the driving and driven members, a V-belt connecting one of the pulleys with the driving member, a V-belt connecting the other pulley with the driven member, means supporting the change speed mechanism, resilient means acting on the supporting means tending to move the change speed mechanism simultaneously away from both the driving and driven members, and control means for bodily moving said supporting means and thus the change speed mechanism positively back and forth at will along a path in a plane perpendicular to the axis of the driving and driven members to inversely vary the distances between the change speed mechanism and the driving and driven members.

8. In a change speed drive of the V-belt type, the combination of a driving pulley and a driven pulley, each having a fixed axis of rotation, a pair of intermediate pulleys mounted for rotary movement about a common axis offset from both of said fixed axes, a pair of V-belts in driving engagement with the intermediate pulleys, extending therefrom at an angle to each other and engaging the driving and driven pulleys, a mounting for the intermediate pulleys, resilient means acting on the mounting to move the intermediate pulleys outwardly of the angle formed by the belts, and means acting on the mounting to adjust the position of the intermediate pulleys relative to the driving and driven pulleys.

9. In a device of the class described, an input pulley, an output pulley, a change speed device including a rotatable member provided with frusto-conical end flanges having their convex surfaces facing inwardly toward each other, and a pair of frusto-conical intermediate flanges therebetween having their convex surfaces facing outwardly away from each other, said end flanges being axially movable relative to said intermediate flanges and coacting therewith to form a pair of inversely expandable pulleys, a V-belt connecting one of the expandable pulleys with the input pulley, another V-belt connecting the other expandable pulley with the output pulley, a two part mounting for the change speed device, a structure engaging one of the parts for supporting the mounting and the other part supporting the change speed drive, manually actuated adjusting means acting on both parts of the mounting for momentarily causing a relative change in the total tensions of the V-belts and thereby causing relative axial movement of the end flanges and intermediate flanges, and resilient means acting on the part of the mounting which carries the change speed drive for moving the same in a direction to equalize the initial tensions of the belts.

10. In a change speed drive of the V-belt type, the combination of a driving member having a fixed axis of rotation, a driven member having a fixed axis of rotation, a change speed mechanism therebetween including a pair of expandable pulleys mounted for rotary movement about a laterally adjustable axle, a belt connecting the driving member with one of the expandable pulleys, a belt connecting the driven member with the other expandable pulley, resilient means acting on the axle tending to move the same simultaneously away from both the driving and driven members, and means for causing a momentary inverse change in the tension of the belts whereby to affect a change in the relative radii of the belts on the expandable pulleys.

11. In a device of the class described, the combination of a stud, a sleeve encircling the stud and having one end reduced to form an end shoulder and said reduced end being externally threaded, the bore of the sleeve at such end being slightly enlarged to form an internal annular shoulder, a plurality of rollers between said sleeve and the stud and fitting against said internal shoulder, a disc forming one part of a pulley mounted on the sleeve and having a hub portion fitted over the unreduced part of the sleeve at the end shoulder and having a flange integral with the hub portion and engaging said end shoulder and an end cap in engagement with said threaded reduced portion and acting to clamp the flange to the end shoulder to secure the disc to the sleeve.

12. In a change speed device of the V-belt type, the combination of a driving pulley and a driven pulley, each having a fixed axis of rotation, a floating assembly including a pair of intermediate pulleys mounted for rotary movement about a common axis offset from both of said fixed axes, a pair of V-belts in driving engagement with the intermediate pulleys and engaging the driving and driven pulleys, resilient means acting on the floating assembly and tending to move the same away from both the driving and driven pulleys, and control means operatively connected with said pulleys and belts to cause a momentary increase in the tension of one of the belts and simultaneously a decrease in the tension of the other belt.

13. In a change speed device of the V-belt type, the combination with a driving pulley and a driving belt and a driven pulley and a driven belt, each of said pulleys having a fixed axis of rotation, of a pair of belt-connected intermediate pulleys mounted for rotary movement about a common floating axis offset from both of said fixed axes and including conical flanges engaged by said belts and axially shiftable in both directions in response to inverse changes in the tensions of the driving and driven belts, a mounting for the intermediate pulleys, means acting through the mounting tending to move the intermediate pulleys away from both the driving and driven pulleys, and manually actuated control means operating through the pulley to vary momentarily the relative tensions of the driving and driven belts.

LOUIS E. SHAW.